United States Patent
Sugihara et al.

(10) Patent No.: US 7,992,996 B2
(45) Date of Patent: Aug. 9, 2011

(54) SPECTACLES-TYPE IMAGE DISPLAY DEVICE

(75) Inventors: Ryohei Sugihara, Machida (JP); Seiji Tatsuta, Hachioji (JP); Yoichi Iba, Hachioji (JP); Koichi Takahashi, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 12/870,451

(22) Filed: Aug. 27, 2010

(65) Prior Publication Data
US 2011/0051077 A1 Mar. 3, 2011

(30) Foreign Application Priority Data
Aug. 31, 2009 (JP) ................................. 2009-200771

(51) Int. Cl.
*G02C 1/00* (2006.01)
*G02B 27/14* (2006.01)
(52) U.S. Cl. ........................................ 351/158; 359/630
(58) Field of Classification Search .................. 351/158, 351/41; 359/631, 630, 633; 385/121, 120, 385/119, 116
See application file for complete search history.

(56) References Cited

U.S. PATENT DOCUMENTS
5,886,822 A * 3/1999 Spitzer .......................... 359/630
7,499,217 B2 * 3/2009 Cakmakci et al. ............ 359/630

FOREIGN PATENT DOCUMENTS
| JP | 05-303056 | 11/1993 |
| JP | 2006-209144 | 8/2006 |
| WO | 98/15868 | 4/1998 |
| WO | 99/23525 | 5/1999 |

* cited by examiner

*Primary Examiner* — Hung X Dang
(74) *Attorney, Agent, or Firm* — Pillsbury Winthrop Shaw Pittman LLP

(57) ABSTRACT

A spectacles-type image display device provided with an image output unit that includes a display element for displaying images and a projection lens for magnifying and projecting the images and a reflection unit that is disposed adjacent to at least one of spectacle lenses and reflects the image light output from the image output unit toward the eyeball is provided. The reflection unit is a reflection member having no refractive power and an effective luminous flux that is output from the image output unit and reaches the eyeball is configured so that the width of the luminous flux perpendicular to an optical axis is minimum at the reflection unit with respect to the optical axis cross-section in at least one direction.

18 Claims, 11 Drawing Sheets

FIG. 9
(a)
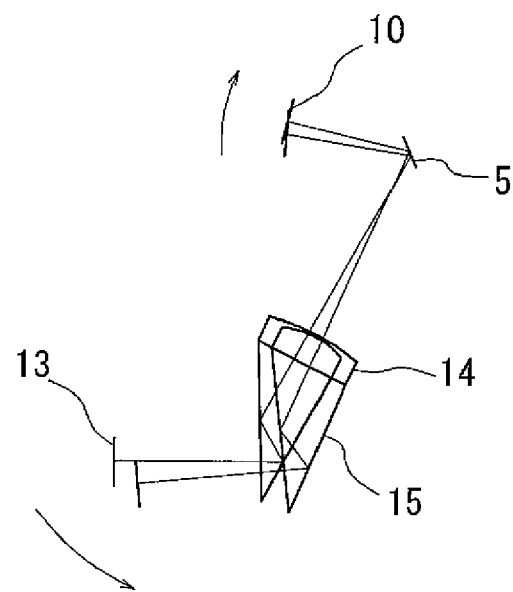
(b)
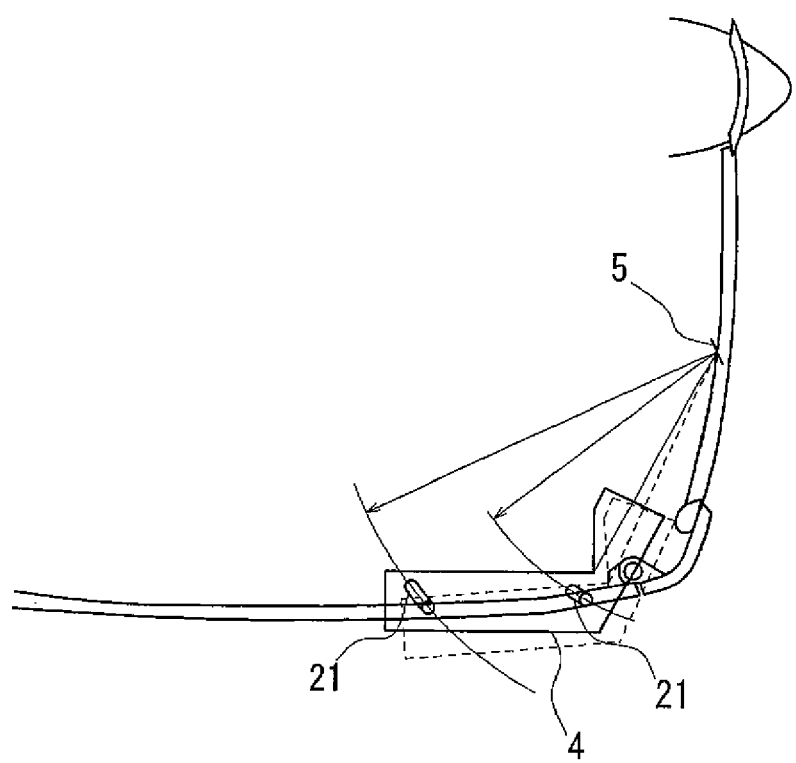

FIG. 10
(a)
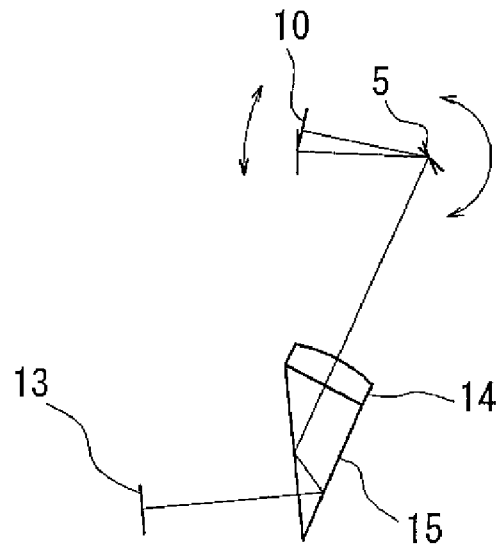
(b)
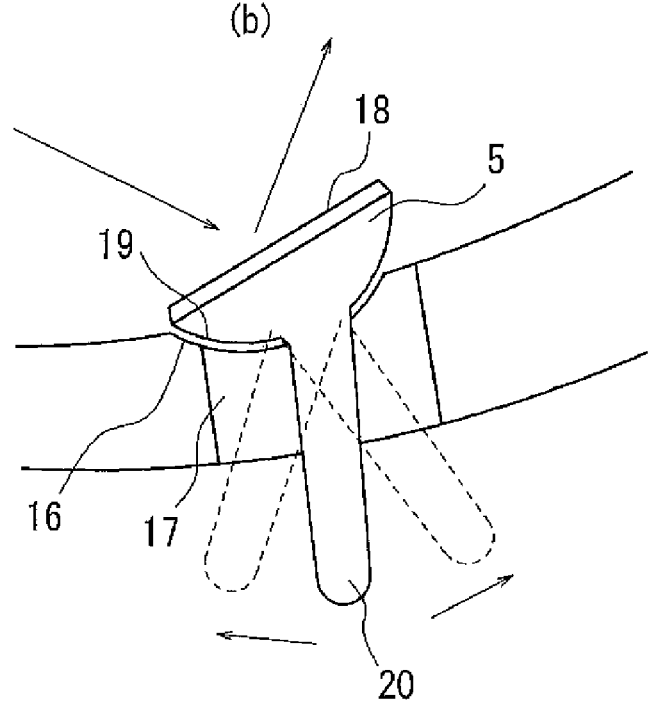

SPECTACLES-TYPE IMAGE DISPLAY DEVICE

CROSS-REFERENCE TO RELATED APPLICATION

The present application claims priority from Japanese Application No. 2009-200771 filed on Aug. 31, 2009, the content of which is incorporated herein by reference.

FIELD OF THE INVENTION

The present invention relates to spectacles-type image display devices.

BACKGROUND OF THE INVENTION

Conventionally, as a spectacles-type image display device, for example, a device that includes an image output unit held on the temple side of spectacles and an eyepiece optical unit held adjacent to a lens of spectacles is suggested. Such spectacles-type image display device is configured so that the image light of electronic images to be displayed that is output from the image output unit is incident on an eyeball of a viewer through an eyepiece optical unit so that the viewer can see the images. In such spectacles-type image display device, usually, the electronic images and the background images that transmit a spectacle lens are superimposed and displayed on an eyeball (what is called a see-through display).

As an example of such technology, a device having a concave mirror that obstructs the front view and a plurality of projection lenses (see, for example, JP5303056 (A)) and a device provided with a holographic optical element disposed on a spectacle lens (see, for example, JP2006209144 (A)) are known. In addition, relating to these technologies, as a spectacles-type image display device, for example, a device configured to hold an image output unit by a spectacle frame and the like to allow the image light to enter from outside the spectacle lens (see, for example, JP2001522064 (T)) and a device that constitutes an optical path for allowing the image light to enter in a spectacle lens (see, for example, JP2000511306 (T)) are known.

SUMMARY OF THE INVENTION

A spectacles-type image display device according to the present invention has an image output unit that is disposed on a spectacle frame and includes a display element for displaying images and a projection lens for magnifying and projecting images and a reflection unit that is disposed adjacent to at least one of the spectacle lenses and is configured, when a viewer wears the spectacles, to reflect image light that is output from the image output unit toward an eyeball of the viewer so that the viewer can see virtual images of the images, wherein the reflection unit is a reflection member having no refractive power, and an effective luminous flux that is output from the image output unit and reaches the eyeball of the viewer is configured so that a width of the effective luminous flux perpendicular to an optical axis is the smallest at the reflection unit with respect to an optical axis cross-section (a cross-section including an optical axis) in at least one direction. That is, in an optical system of the spectacles-type image display device of the present configuration, a reflection member functions substantially as an aperture stop with respect to the optical axis cross-section in at least one direction. In other words, an exit pupil position with respect to the optical axis cross-section in at least one direction can be a reflection member.

It is preferable that the smallest width of the cross-section perpendicular to the optical axis is smaller than 4 mm, which is an average pupil diameter of human.

Further, it is preferable that, with respect to a reflection surface of the reflection member, the width in a direction parallel to the incident surface is smaller than the width in a direction perpendicular to the incident surface. In other words, in the optical axis cross-section parallel to the incident surface, the reflection member functions as an aperture stop. Further, the image output unit is disposed on a spectacle frame (that is, light ray enters from the side) and, thereby the reflection member is in the vertically long shape.

In addition, it is preferable that the display element is in the shape of rectangular and is disposed so that the longitudinal direction of the rectangular shape corresponds to the minimum width direction of the reflection surface of the reflection member. In other words, the display element is laterally long even though the reflection member is vertically long.

Further, with respect to the effective luminous flux that is output from the image output unit and reaches the eyeball of the viewer, it is preferable that a pupil position in the lateral direction, which is an exit pupil position with respect to the optical axis cross-section parallel to the incident surface of the reflection member, is located near the reflection member, and a pupil position in the longitudinal direction, which is an exit pupil position with respect to the optical axis cross-section perpendicular to the incident surface of the reflection member, is located closer to a pupil of eyeball of the viewer than the pupil position in the lateral direction. In other words, the reflection member functions as an aperture stop with respect to the optical axis cross-section parallel to the incident surface, but it does not function as an aperture stop with respect to the optical axis cross-section perpendicular to the incident surface.

In addition, it is preferable that the reflection member is embedded in the spectacle lens.

Further, it is preferable that the optical axis of the projection lens passes through the reflection member and the projection lens or the image output unit including the projection lens is rotatably held around the reflection unit.

In addition, it is preferable that the optical axis of the projection lens passes through the reflection member and the reflection unit is rotatably held by a rotation axis that lies in the reflection surface of the reflection member.

Further, for the image output unit, it is preferable that a deviation prism is provided between the display element and the projection lens.

In addition, it is preferable that the display element is disposed to face the forward direction of the viewer, and the light ray output from the display element is incident on the deviation prism, is deviated by 50° to 70° and exits toward the reflection unit.

Further, it is preferable that the projection lens and the deviation prism are integrally molded.

In addition, it is preferable that the projection lens and the deviation prism are held by an endpiece of the spectacles, the display element is held by a temple of the spectacles and the display element is movable and adjustable in the direction perpendicular to the display surface.

Further, it is preferable that the distance between the projection lens and the deviation prism is adjustably held.

In addition, it is preferable that the projection lens and the deviation prism are held by the endpiece of the spectacles, the display element is held by the temple of the spectacles and the display element is movable and adjustable in the direction parallel to the display surface.

Further, it is preferable that the display element is an organic EL.

In addition, it is preferable that the display element is disposed on a position where the projection cross-section with respect to the front direction of the viewer does not cover a pupil of the viewer.

BRIEF DESCRIPTION OF THE DRAWING

FIG. 9 is a diagram illustrating an example of interpupillary adjustment in accordance with the second embodiment of the present invention;

FIG. 10 is a diagram illustrating an example of interpupillary adjustment in accordance with the second embodiment of the present invention;

DESCRIPTION OF THE PREFERRED EMBODIMENTS

Embodiments of the present invention are illustrated below with reference to the diagrams.

First Embodiment

Figure 1:
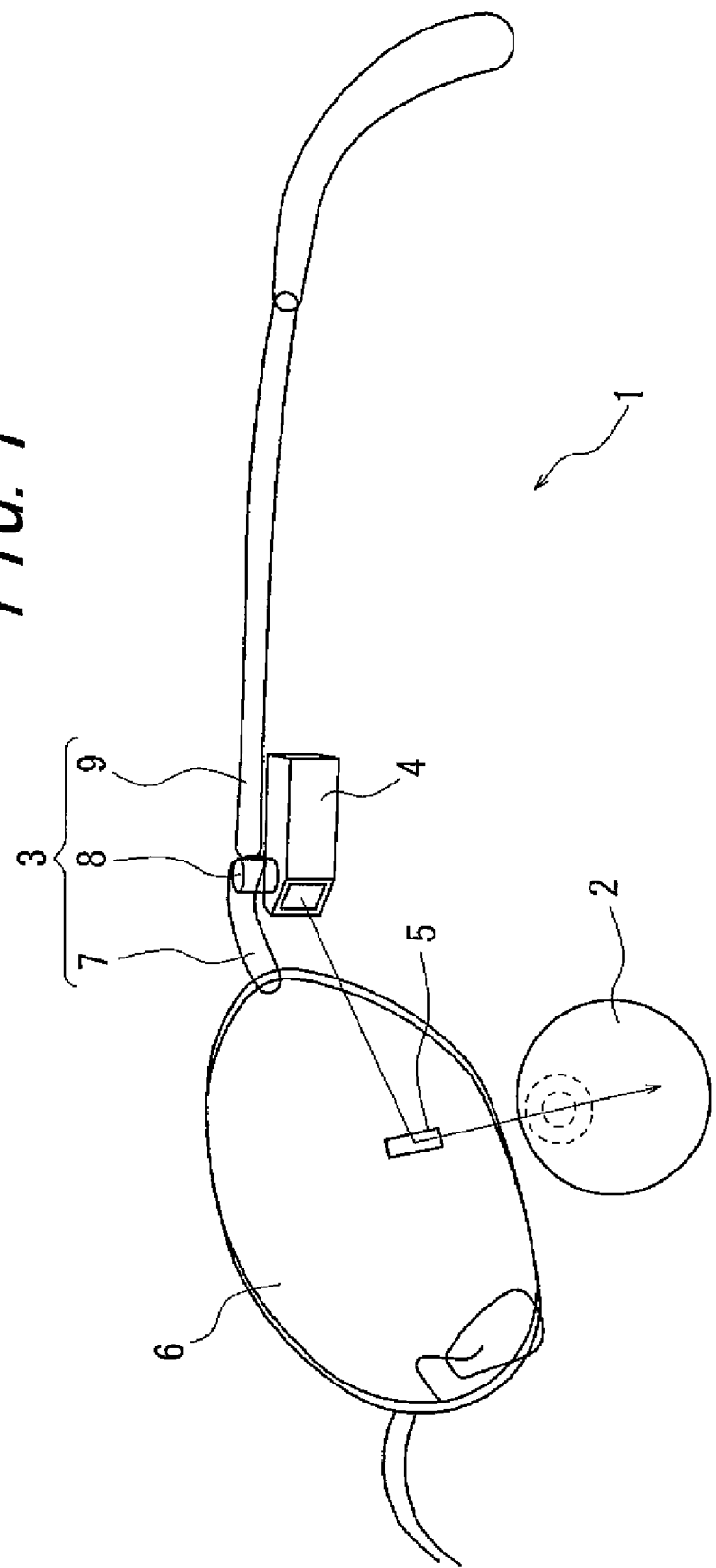
FIG. 1 is a partial block diagram schematically illustrating main parts of a spectacles-type image display device in accordance with a first embodiment of the present invention.

FIG. 1 is a partial block diagram schematically illustrating main parts of a spectacles-type image display device in accordance with a first embodiment of the present invention. In this diagram, an eyeball 2 of the right eye of a viewer when he/she wears the spectacles-type image display device 1 is also shown. As shown in the diagram, the spectacles-type image display device 1 of the present embodiment has an image output unit 4 disposed on a frame unit 3 of the spectacles and a reflection unit 5 that reflects image light that is output from the image output unit 4 toward the eyeball 2 of the viewer.

The image output unit 4 has therein a display element (not shown in FIG. 1) for displaying two-dimensional images and a projection lens (not shown in FIG. 1) for magnifying and projecting the two dimensional images and outputs image light through the projection lens. As a display element, general display elements such as, for example, a liquid crystal display element or an organic EL element can be used. These general display elements are known as low cost devices. In particular, when an organic EL element is used as a display element, a backlight is not needed and, thereby a compact and lightweight device which requires less power can be achieved.

Figure 2:
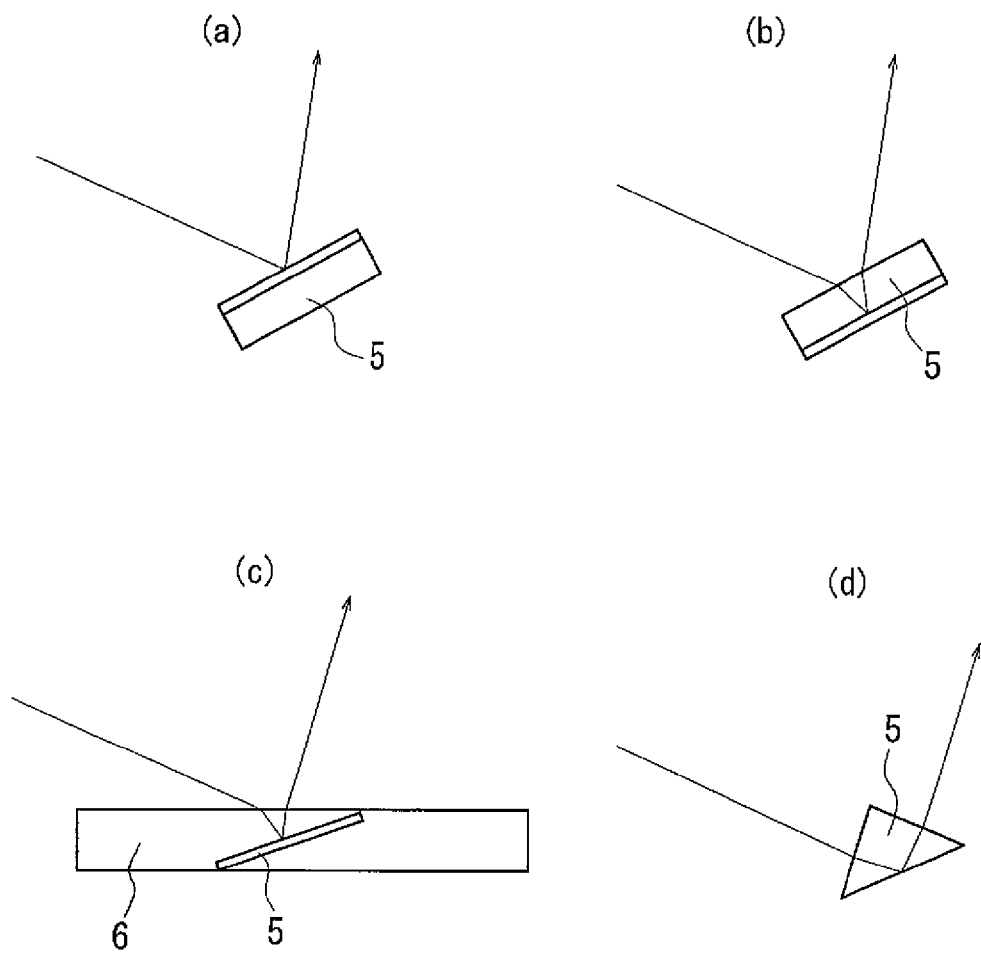
FIG. 2 is a diagram illustrating an example of a reflection unit used for carrying out the present invention.

The reflection unit 5 is a reflection member with no refractive power located adjacent to a spectacle lens and is disposed so as to reflect image light that is output from the image output unit 4 toward the eyeball 2 of the viewer to enable the viewer to see the virtual images of two-dimensional images when the viewer wears the spectacles. As shown in FIG. 2, as a reflection unit 5, (a) front surface reflection mirror, (b) rear surface reflection mirror, (c) mirror embedded in a spectacle lens and (d) total reflection prism and the like can be used. As a front surface reflection mirror and a rear surface reflection mirror, a mirror whose front surface and back surface are treated respectively with a typical mirror coating such as metal deposition or dielectric multi-layered film can be used. When a mirror embedded in a spectacle lens is used, the angle of tilt can be reduced by the refraction between the spectacle lens and the air. When a total reflection prism is used, refraction can be achieved without mirror coating.

A spectacle frame 3 is fixed to a spectacle lens 6 (or a frame of the spectacle lens 6) and includes an endpiece 7 located at both ends on the front surface of the spectacles and a temple 9 foldably coupled through the endpiece 7 and a hinge 8. The image output unit 4 in accordance with the present embodiment is held by the temple 9 through the hinge 8 and folded together with the temple 9 when the spectacle frame 3 is folded.

In the above arrangement, image light that is output from the image output unit 4, reflected by the reflection unit 5 and reaches the eyeball 2 of the viewer transmits through the space surrounded by the spectacle lens 6, the spectacle frame 3 (and the viewer's face). Such configuration can reduce obstacles that block the viewer's field of vision as much as possible and allows no parts to be interfered (by the image output unit 4, for example) when the spectacle frame 3 is folded.

Figure 3:
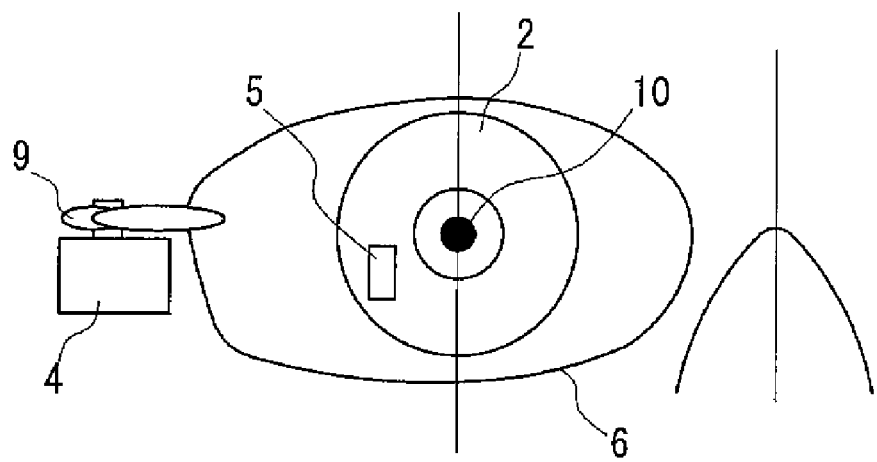
FIG. 3 is an elevation view of a right eye side of a viewer when the viewer wears the spectacles-type image display device of FIG. 1.

FIG. 3 is an elevation view of the right eye side of the spectacles-type image display device of FIG. 1 when the viewer wears it. As shown in FIG. 3, in the spectacles-type image display device according to the present embodiment, for the projection cross-section with respect to the front direction of the viewer, the reflection unit 5 is disposed on a position where the reflection unit 5 does not cover a pupil 10 of the viewer. In the present embodiment, the reflection unit 5 is disposed on this position and, thereby the field of vision of the viewer can be secured sufficiently in the normal situation (when the viewer directs more attention to the information around him/her than the information from the spectacles-type image display device), and the viewer can move about safely even when the viewer wears the spectacles-type image display device in accordance with the present embodiment.

In addition, as shown in FIG. 3, in the spectacles-type image display device in accordance with the present embodiment, the reflection unit 5 is in the shape of vertically-long rectangular. On the other hand, the image output unit 4 and the display element disposed therein are in the shape of laterally-long rectangular. In other words, the device is configured so that the longitudinal direction of display element corresponds to the minimum width direction of the reflection unit and, thereby image light can be led to the narrow space between the spectacles and the face even if the image is a laterally long display. In addition, in the spectacles-type image display device in accordance with the present embodiment, since the reflection unit 5 is in the shape of vertically-long rectangular, tolerance is high with respect to the vertical slippage in the state where the device is mounted. Further, if the tolerance of vertical slippage by the vertically-long reflection unit is used as an image display area, the configuration in accordance with the present embodiment can be used for the vertically-long display screen (i.e. a vertically-long display element).

Figure 4:
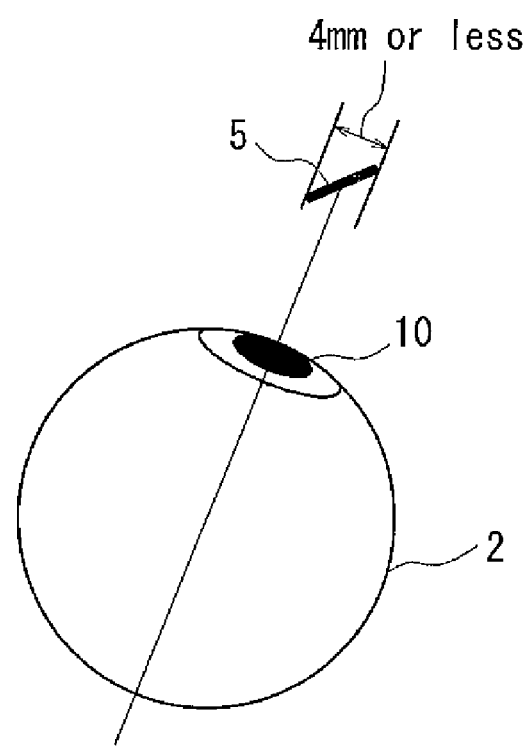
FIG. 4 is an elevation view illustrating the width of a rectangular reflection unit in the short side direction in accordance with the first embodiment of the present invention.

FIG. 4 is a diagram illustrating the width in the short side direction of a rectangular reflection unit in accordance with the present embodiment. As described hereinbefore, in the present embodiment, the image light that is output from the image output unit 4 is reflected by the reflection unit 5 and is led to the eye pupil 10 of the eyeball 2. Thus, the reflection unit 5 is disposed obliquely with respect to the line of sight of the eyeball 2 (or the optical axis of the image light that is output from the image output unit 4). In other words, for the viewer's field of vision, the size of the reflection unit 5 is different from the actual size thereof. In the present embodiment, the device is configured so that the width of the cross-section vertical to the optical axis (projection cross-section in the direction of line of sight) of the reflection unit 5 is 4 mm or less. This numerical value, 4 mm, is based on the average diameter of human pupil, and when the width of the cross-section vertical to the optical axis of the reflection unit 5 is less than 4 mm, what is called a pupil division see-through, by which background light that is not obstructed by the reflection unit 5 transmits the eye pupil 10 and forms an image on the amphiblestrode, is realized and, thereby the image light that is output from the image output unit 4 is superimposed on the background light.

Figure 5:
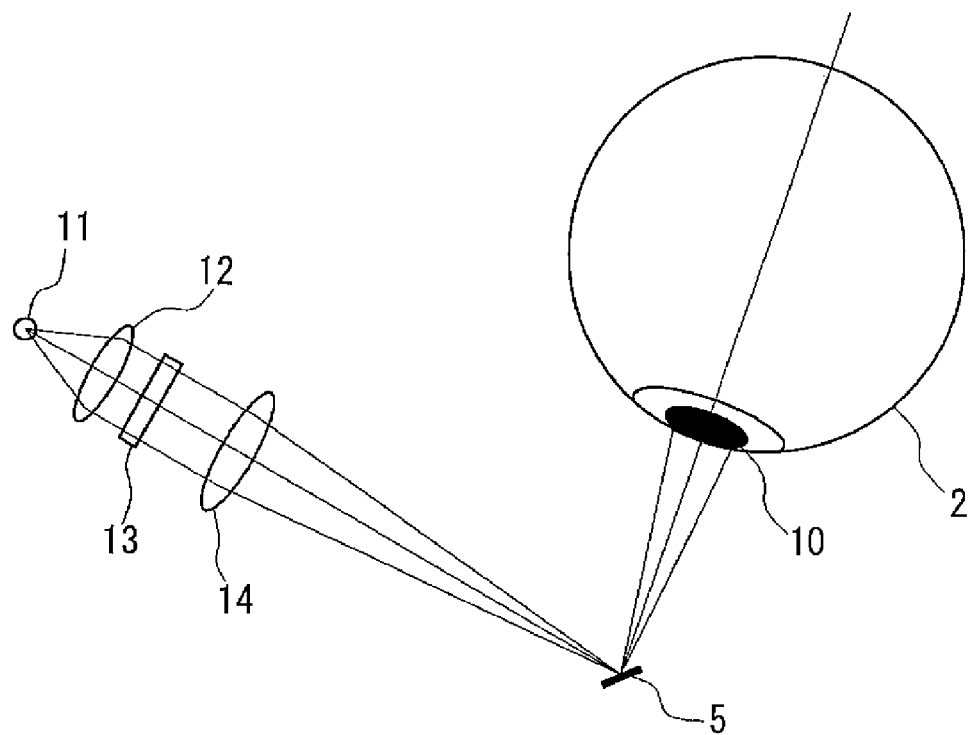
FIG. 5 is a basic block diagram showing extracted optical elements in accordance with the first embodiment of the present invention.

FIG. 5 is a basic block diagram showing extracted optical elements in accordance with the present embodiment for more detailed explanation of the optical system in accordance with the present embodiment. In the optical system in accordance with the present embodiment, as shown in FIG. 5, the illuminating light that is output from a light source 11 is converted into roughly-parallel light by an illumination lens 12 and is delivered to a display element 13 (such as a liquid crystal display element). Thereafter, the display element 13 outputs image light that contains the image information, and the image light is converted into convergent ray by the projection lens 14 and is led to the reflection unit 5. The reflection unit 5 reflects the incident image light from the projection lens 14 toward the eye pupil 10 of the eyeball 2.

As shown in FIG. 5, in the optical axis cross-section along the direction of the plane of paper of the optical system in accordance with the present embodiment, the aperture of the reflection unit 5 is the smallest. In other words, with respect to the optical axis cross-section parallel to the incident surface of the reflection surface of the reflection unit 5, the reflection unit 5 functions as a substantial aperture stop of the optical system in accordance with the present embodiment, or, it could be said that an exit pupil position exists in the reflection unit 5. In this manner, in the optical system in accordance with the present embodiment, since the reflection unit 5 is an exit pupil position, the shape of the reflection unit 5 can be determined regardless of the shape of image (i.e. the shape of display element). Thus in the present embodiment, as described hereinbefore, the reflection unit 5 can be in the shape of vertically-long rectangular even though the display element 13 is in the shape of laterally-long rectangular.

For example, when a liquid crystal display element is used as the display element 13, it is preferable that the reflection unit 5 is disposed near the back focus position of the projection lens 14. For the liquid crystal display element, better image quality can be obtained by adopting the object side telecentric optical system. That is, it is preferable to configure the device so that the back focus position is an exit pupil position. Thus a preferable configuration in the case of using a liquid crystal display element as the display element 13 is obtained by disposing the reflection unit 5, which is an optical element with the smallest aperture, on the back focus position. Further, for the configuration, since the image of the light source 11 locates near the reflection unit 5, the light diffused from the image of the light source 11 is reflected by the reflection unit 5 in the collected state and, thereby improved illumination efficiency can be obtained.

It should be noted that when an organic EL display element is used as the display element 13, it is not required to adopt a telecentric optical system. Therefore it is possible to configure so that the reflection unit 5 is not disposed on the back focus position.

Figure 6:
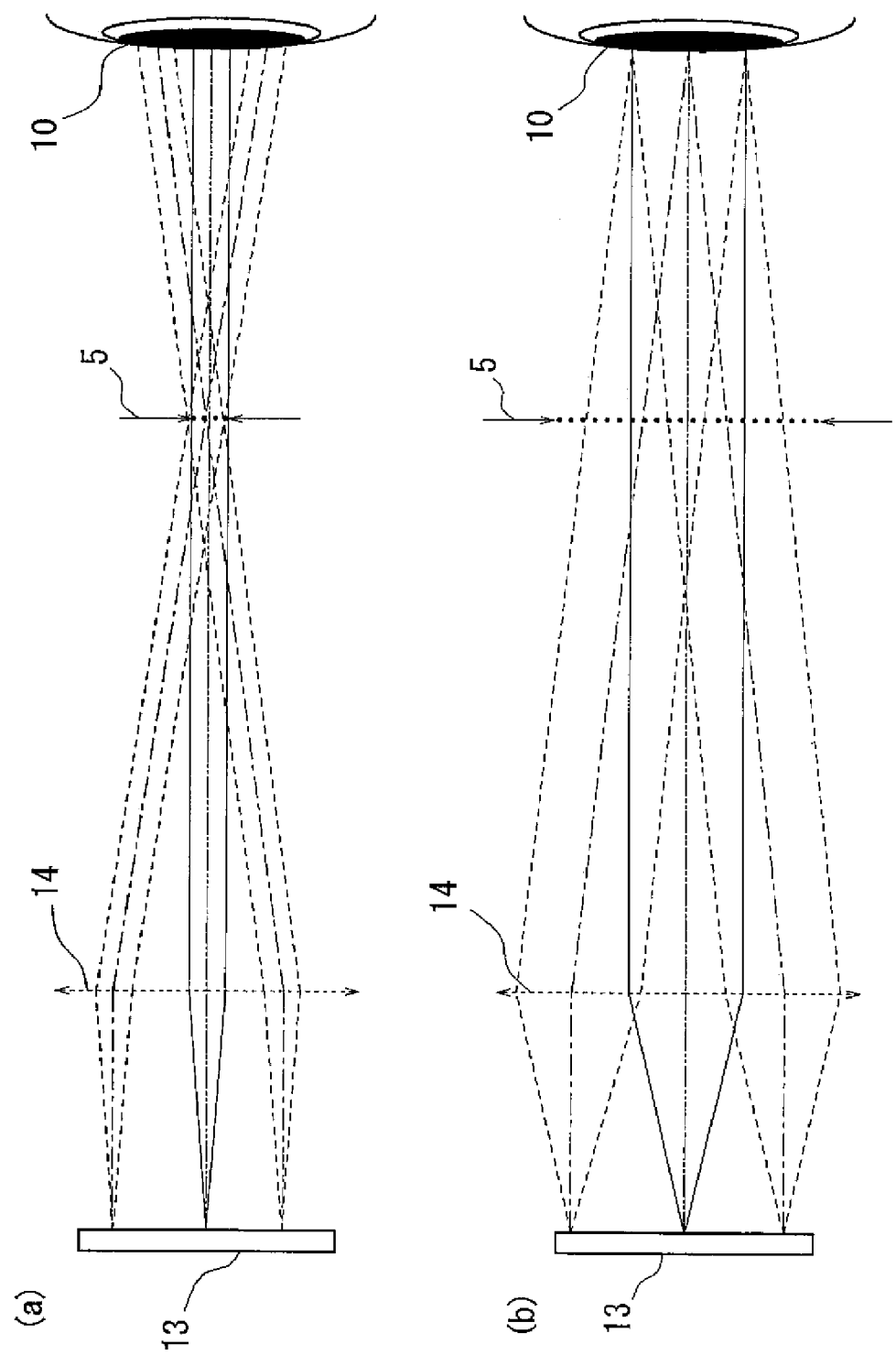
FIG. 6 is a ray diagram of an optical axis cross-section in the lateral direction and an optical axis cross-section in the longitudinal direction of an optical system in accordance with the first embodiment of the present invention.

FIG. 6 is a diagram illustrating the difference between (a) the optical axis cross-section in the lateral direction (i.e. the optical axis cross-section parallel to the incident surface of the reflection unit) and (b) the optical axis cross-section in the longitudinal direction (i.e. the optical axis cross-section perpendicular to the incident surface of the reflection unit) of an optical system in accordance with the present embodiment. It should be noted that in FIG. 6, in order to describe on the plane of paper, light reflected by the reflection unit 5 is expressed as a straight line.

In FIGS. 6A and 6B, the main light ray on the optical axis, the marginal light ray on the optical axis, the main light ray outside the axis, the marginal light ray outside the axis are indicated respectively by two-dot chain line, solid line, chain line and dashed line. As shown in FIG. 6A, in the optical system according to the present embodiment, lateral luminous flux is defined by the reflection unit 5 (in other words, the reflection unit 5 functions as an aperture stop). Therefore the marginal light ray outside the axis crosses the optical axis. On the other hand, as shown in FIG. 6B, since the reflection unit 5 has a sufficiently large aperture with respect to the longitudinal direction, the reflection unit 5 has no function as a substantial aperture stop, and the eye pupil 10 functions as an aperture stop.

It should be noted that although the spectacles-type image display device 1 illustrated by the present embodiment is configured to display electronic images to the right eye, it may be configured to display electronic images to the left eye.

Second Embodiment

Figure 7:
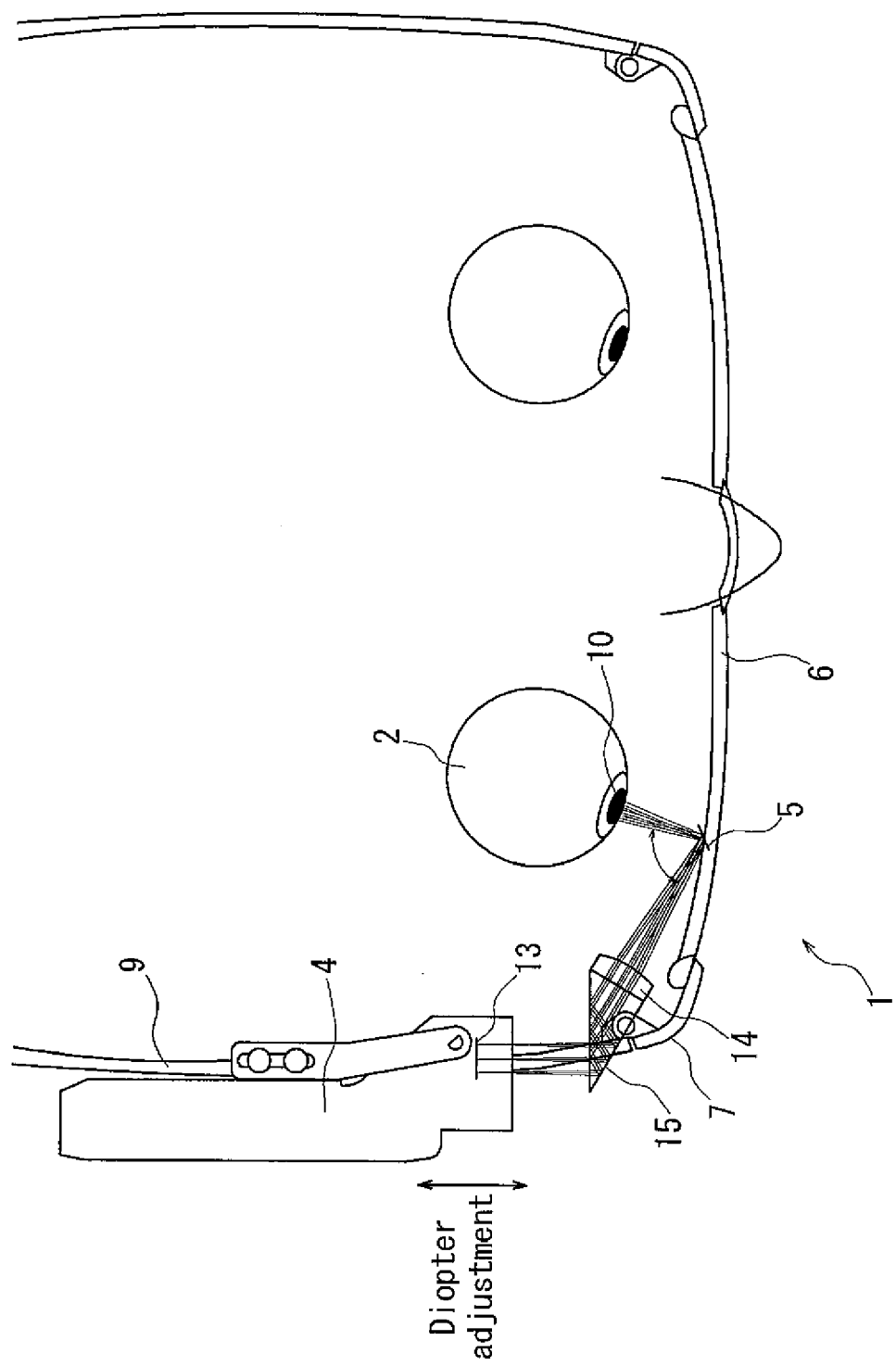
FIG. 7 is a diagram illustrating a configuration and in-use state of a spectacles-type image display device in accordance with a second embodiment of the present invention.

FIG. 7 is a block diagram schematically illustrating a spectacles-type image display device in accordance with a second embodiment of the present invention. In this diagram, an eyeball 2 of the right eye of a viewer when he/she wears the spectacles-type image display device 1 is also shown. As shown in the diagram, the spectacles-type image display device 1 in accordance with the present embodiment is provided with an image output unit 4 disposed on a temple 9 of the spectacles and a reflection unit 5 for reflecting image light that is output from the image output unit 4 toward the eyeball 2 of the viewer.

The image output unit 4 has therein a display element 13 for displaying two-dimensional images and outputs image light. As a display element 13, as in the case of the first embodiment, general display elements such as, for example, a liquid crystal display element and an organic EL element can be used. Thereafter, image light that is output from the display element 13 (i.e. the image output unit 4) is incident on the deviation prism 15, is deviated by 50°-70°, and exits toward the reflection unit. In the embodiment shown in FIG. 7, the deviation prism 15 and the projection lens 14 are integrally molded, and the image light that exits from the deviation prism 15 and the projection lens 14 toward the reflection unit 5 is convergent ray.

As an example of the deviation prism 15, a prism having an apex angle of 30°, 60° and 90° (what is called a 30° prism) can be used. When a 30° prism is used, a deviation of 60° can be obtained by entering the image light perpendicular to a surface opposing to an apex of 90°, reflecting the image light by a surface opposing to an apex of 60°, totally reflecting the image light by a surface opposing to an apex of 90° and exiting the image light from a surface opposing to an apex of 30°.

The reflection unit 5 is a reflection member having no refractive power and is disposed so that, when a viewer wears the spectacles, it reflects image light that is output from the image output unit 4 toward the eyeball 2 of the viewer so that the viewer can see the virtual images of two-dimensional images. As in the case of the first embodiment, as a reflection unit 5, (a) front surface reflection mirror, (b) rear surface reflection mirror, (c) mirror embedded in a spectacle lens and (d) total reflection prism and the like can be used (see FIG. 2). It should be noted that, as in the case of the first embodiment, with respect to the projection cross-section to the front direction of the viewer, the reflection unit 5 is disposed on a position where the reflection unit 5 does not cover an eye pupil 10 of the viewer (see FIG. 3). Also in the present embodiment, disposition of the reflection unit 5 on this position allows the viewer to secure his/her field of vision sufficiently and, thereby the viewer can move about safely even when he/she wears the spectacles-type image display device in accordance with the present embodiment. Specifically, in the present embodiment, the deviation prism 15 allows the light ray to be incident on the reflection unit 5 at a sharper angle than the first embodiment and, thereby the reflection unit 5 can be disposed on the position where the field of vision is less obstructed.

In the present embodiment shown in FIG. 7, the projection lens 14 and the deviation prism 15 are held by the endpiece 7 of the spectacles. Further, the image output unit 4 is held by the temple 9 of the spectacles and is movable and adjustable in the direction perpendicular to the display surface of the display element 13. With this configuration, the diopter can be adjusted by changing the distance between the display element 13 and the deviation prism 15. In addition, if the display element 13 is movable and adjustable parallel to the display surface, interpupillary adjustment can be performed. Further, if the projection lens 14 and the deviation prism 15 are not integrally molded and the distance between the projection lens 14 and the deviation prism 15 is adjustably held, diopter can be adjusted by adjusting the distance.

Figure 8:
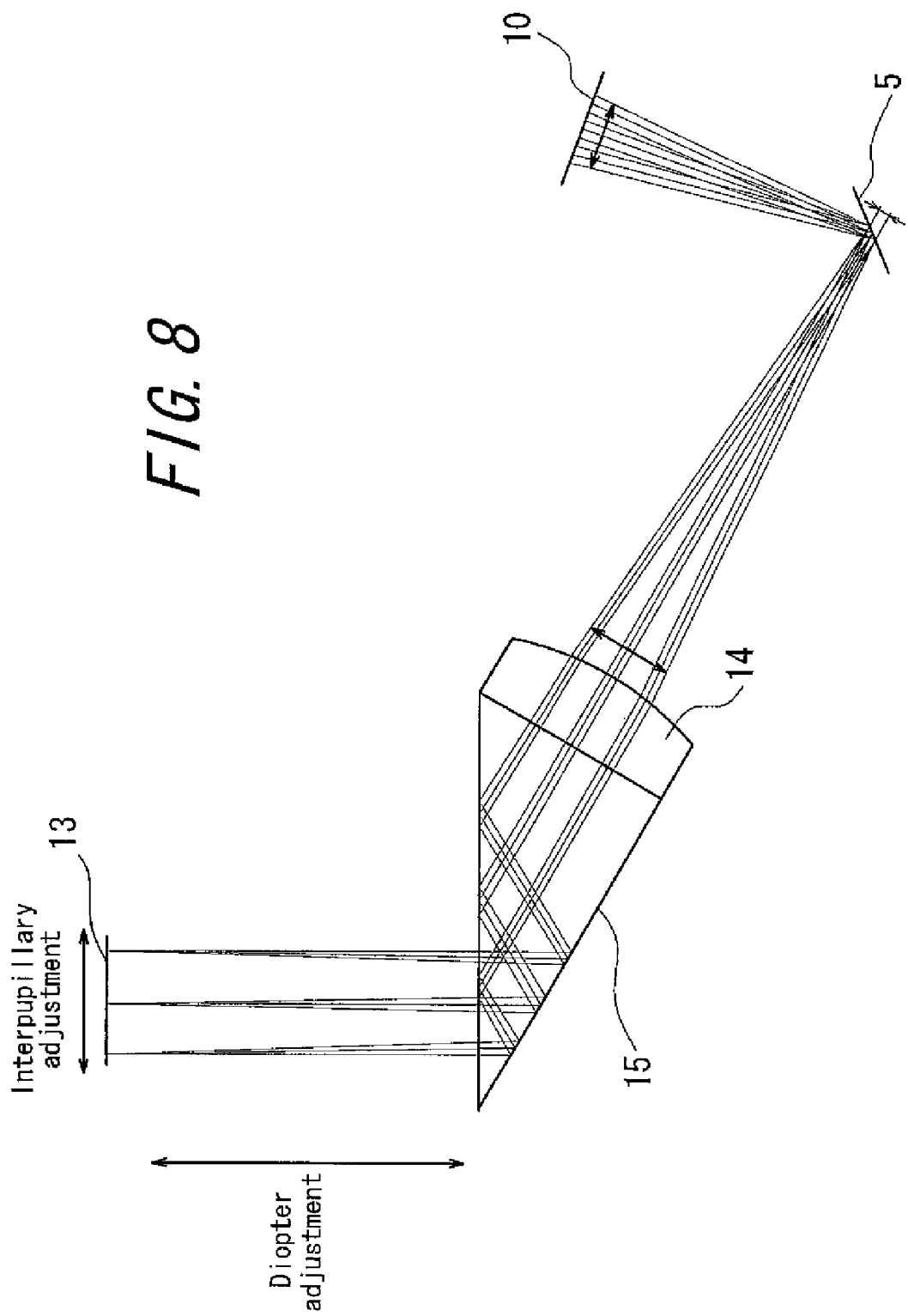
FIG. 8 is a basic block diagram showing extracted optical elements in accordance with the second embodiment of the present invention.

FIG. 8 is a basic block diagram showing extracted optical elements of the present embodiment for more detailed explanation of the optical system in accordance with the present embodiment. As shown in FIG. 8, in the optical system in accordance with the present embodiment, image light containing the image information is output from the display element 13, is deviated by the deviation prism 15, is converted into convergent ray by the projection lens 14, and is led to the reflection unit 5. The reflection unit 5 reflects the incident image light from the projection lens 14 toward the eye pupil 10 of the viewer. In this case, the direction of the incident surface of the reflection unit 5 is the same as that of the plane of paper, which is substantially horizontal when it is seen from the viewer. As can be seen, also in the present embodiment, as in the case of the first embodiment, the luminous flux diameter of the optical axis cross-section in the direction of the plane of paper is the smallest at the reflection unit 5. In other words, also in the present embodiment, with respect to the optical axis cross-section in the direction of the incident surface, the reflection unit 5 functions substantially as an aperture stop. Thus also in the present embodiment, since the reflection unit 5 is the pupil position, the reflection unit 5 can be in the shape of vertically long rectangular even though the display element 13 is in the shape of laterally-long rectangular.

As can be seen from the basic block diagram shown in FIG. 8, in the present embodiment, the distance between the display element 13 and the projection lens 14 is changed by changing the distance between the display element 13 and the deviation prism 15 and as a result, the diopter adjustment can be performed. Further, if the display element 13 is movable and adjustable parallel to the display surface, the projection position of the display element 13 to the eye pupil 10 shifts parallel and as a result, a configuration capable of performing interpupillary adjustment can be obtained. In addition, the distance between the display element 13 and the projection lens 14 is changed by adjusting the distance between the projection lens 14 and the deviation prism 15 and, thereby diopter adjustment can be performed.

FIG. 9 shows another example of interpupillary adjustment in accordance with the present embodiment. FIG. 9A illustrates only optical elements and FIG. 9B illustrates an interpupillary adjustment mechanism.

In FIG. 9A, as in the case of the optical elements shown in FIG. 8, image light containing the image information is output from the display element 13, is deviated by the deviation prism 15, is converted into the convergent ray by the projection lens 14 and is led to the reflection unit 5. Thereafter, the reflection unit 5 reflects the incident image light from the projection lens 14 toward the eye pupil 10 of the viewer. At this time, the image output units (in FIG. 9A, the display element 13, the deviation prism 15 and the projection lens 14) are rotated around the reflection unit 5. As a result of this, since the viewable position on the eye pupil 10 of the viewer shifts, the interpupillary adjustment can be achieved.

According to the example of the interpupillary adjustment mechanism of FIG. 9B, the image output unit 4 has an arc-shaped guide 21 centered on the reflection unit 5 and through the guide 21, the image output unit 4 is held by the spectacle frame 3 and, thereby the image output unit 4 is held rotatably around the reflection unit and the spectacles-type image display device capable of performing interpupillary adjustment is realized.

FIG. 10 is a diagram illustrating another example of interpupillary adjustment in accordance with the present embodiment. FIG. 10A illustrates only optical elements, and FIG. 10B illustrates an interpupillary adjustment mechanism.

As in the case of the optical elements shown in FIG. 8, in FIG. 10A, image light containing the image information is output from the display element 13, is deviated by the deviation prism 15, is converted into convergent ray by the projection lens 14 and is led to the reflection unit 5. Thereafter, the reflection unit 5 reflects the incident image light from the projection lens 14 toward the eye pupil 10 of the viewer. At this time, the reflection unit 5 is rotated around the axis that lies in the reflection surface of the reflection unit. As a result, the viewable position on the eye pupil 10 of the viewer shifts and, thereby interpupillary adjustment can be achieved.

According to the example of interpupillary adjustment mechanism shown in FIG. 10B, a groove having a concave surface 16 is formed in the spectacle lens and further, on a part of the groove, a through hole 17 that passes through the spectacle lens is provided. With respect to the reflection unit 5, a convex surface 19 is provided as a rear face of the reflection surface 18, and a knob 20 that passes through the through hole 17 is formed. The concave surface 16 and the convex surface 19 are slidably fitted to each other and the reflection surface 18 is deviated by the knob 20 that passes through the through hole 17. With such configuration, the center of curvature of the concave surface 16 and the convex surface 19 will be the center of rotation of the reflection surface 18 and, thereby rotation around the axis that lies in the reflection surface is achieved. That is, the spectacles-type image display device capable of performing interpupillary adjustment can be realized.

It should be noted that although the examples of interpupillary adjustment with reference to FIGS. 9 and 10 are illustrated using the second embodiment, these examples can be carried out appropriately also by the first embodiment.

Third Embodiment

Figure 11:
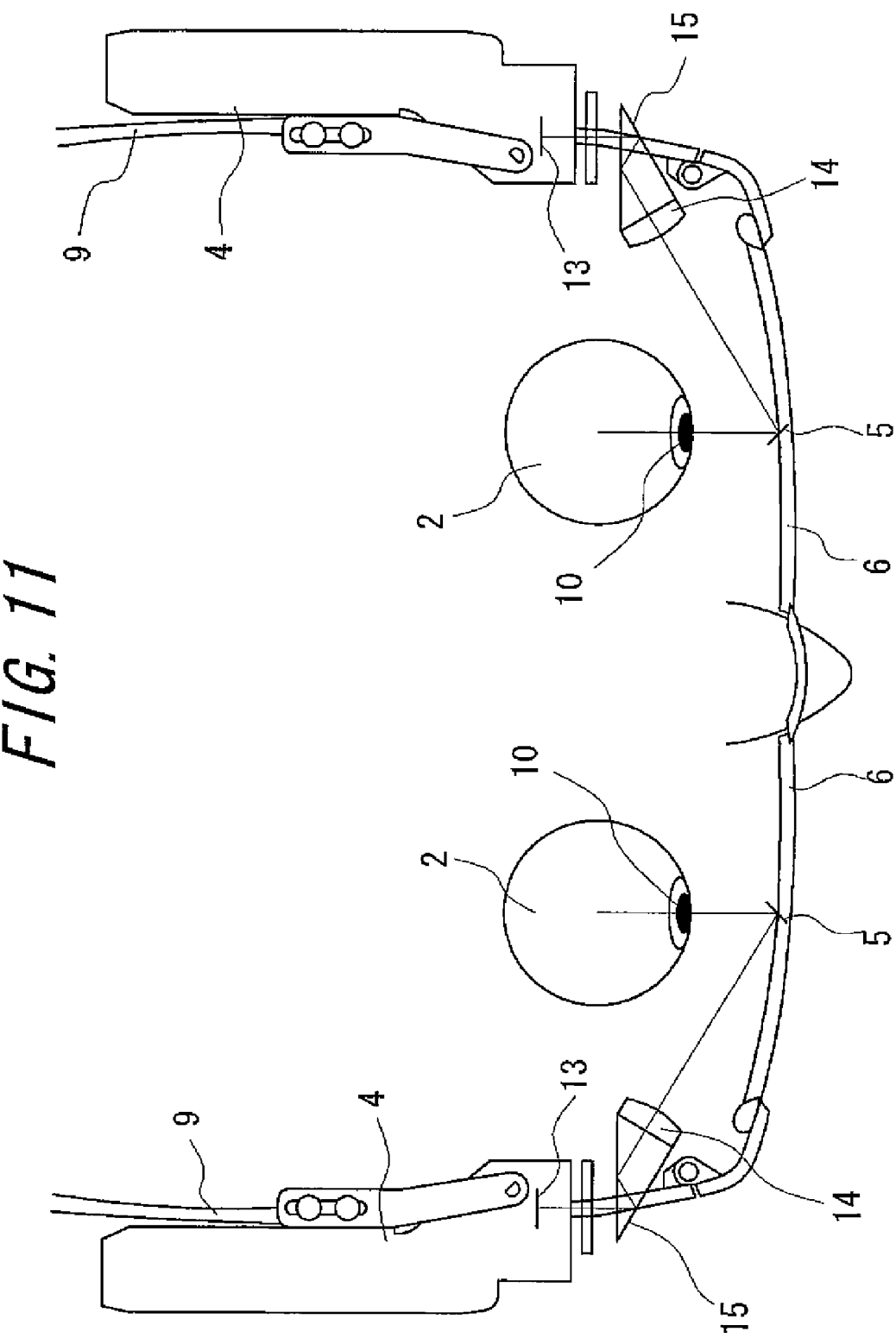
FIG. 11 is a diagram schematically illustrating a spectacles-type image display device in accordance with a third embodiment of the present invention.

FIG. 11 is a basic block diagram schematically illustrating a spectacles-type image display device in accordance with a third embodiment of the present invention. In the present embodiment, the use of spectacles-type image display device in accordance with the second embodiment illustrated with reference to FIG. 7 is expanded for binocular use. In other words, the spectacles-type image display device 1 in accordance with the present embodiment is provided with an image output unit 4 disposed on a temple 9 of the spectacles, a deviation prism 15 for deviating the image light that is output from the image output unit 4, a projection lens 14 for magnifying and projecting two-dimensional images displayed by the display element 13 in the image output unit 4 and a reflection unit 5 for reflecting image light from the projection lens 14 toward eyeball 2 of the viewer. These units are provided for the right eye and for the left eye. Here, each function of the present embodiment is similar to that of the spectacles-type image display device in accordance with the second embodiment, thus the similar description is omitted by allocating each identical symbol in the figure. In other words, the spectacles-type image display device in accordance with the present embodiment has the functions and effects owned by the spectacles-type image display device in accordance with the second embodiment.

As shown in FIG. 11, in the present embodiment, the incidence angle of the image light is the same for the right eye and for the left eye. In other words, the viewer wearing the spectacles-type image display device in accordance with the present embodiment sees one image in front of him/her. At this time, a three-dimensional image can be displayed by displaying disparity images to the right eye and the left eye. Further, a see-through display is possible by reducing the width of the reflection unit 5 in the short side direction to less than 4 mm, which is the average pupil diameter of human and, thereby a three-dimensional image can be superimposed on the background of the viewer and as a result, very realistic stereo display can be achieved. In addition, the incidence angle of the image light may be inwardly angled for the amount of the convergence of the eyeball.

Fourth Embodiment

Figure 12:
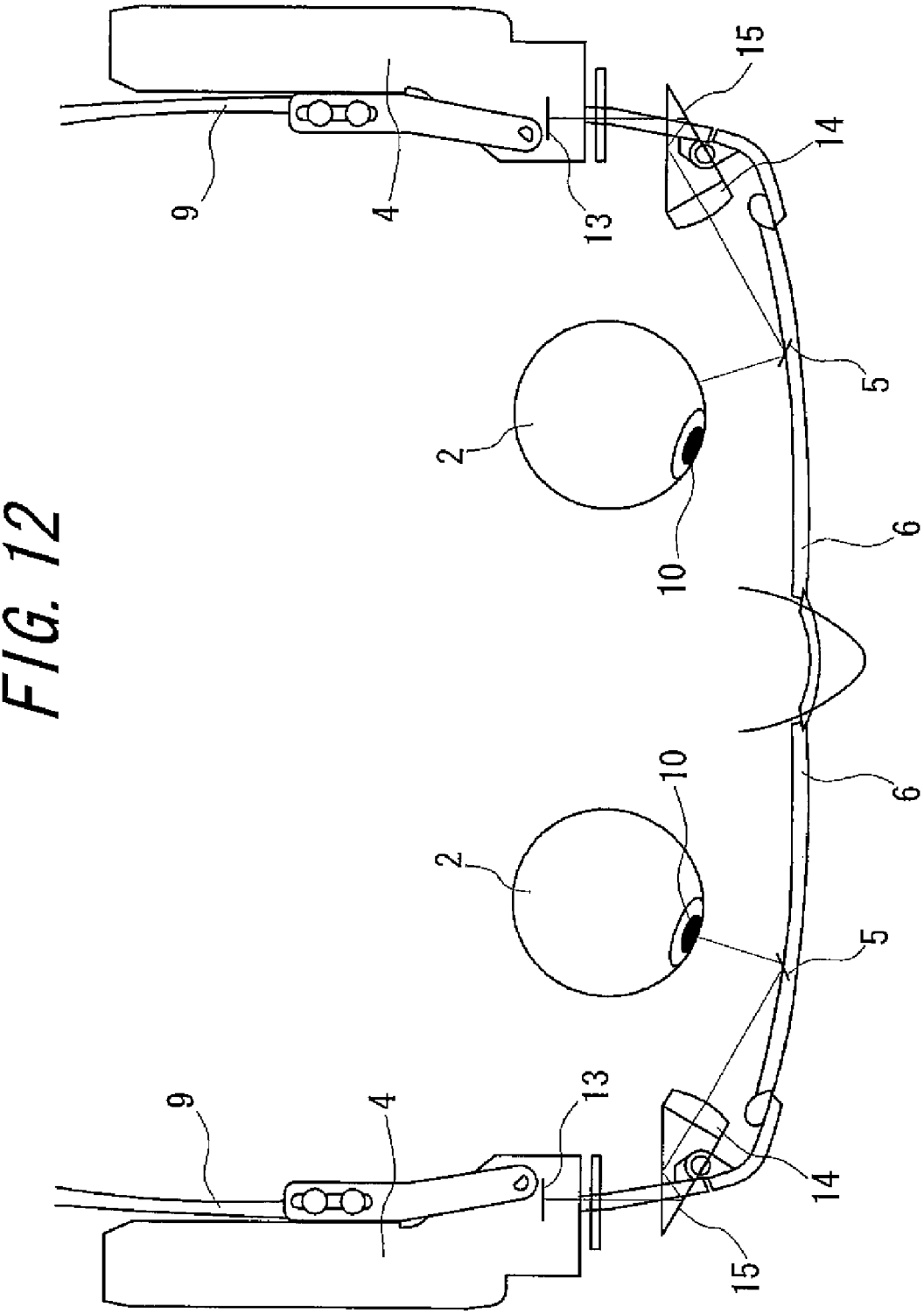
FIG. 12 is a diagram schematically illustrating a spectacles-type image display device in accordance with a fourth embodiment of the present invention.

FIG. 12 is a block diagram schematically illustrating a spectacles-type image display device in accordance with a fourth embodiment of the present invention. In the present embodiment, the use of the spectacles-type image display device illustrated with reference to FIG. 7 is expanded to binocular use. In other words, the spectacles-type image display device 1 in accordance with the present embodiment is provided with an image output unit 4 disposed on a temple 9 of the spectacles, a deviation prism 15 for deviating the image light that is output from the image output unit 4, a projection lens 14 for magnifying and projecting two-dimensional images displayed by the display element 13 in the image output unit 4 and a reflection unit 5 for reflecting image light from the projection lens 14 toward eyeball 2 of the viewer. These units are provided for the right eye and for the left eye. Here, each function of the present embodiment is similar to that of the spectacles-type image display device in accordance with the second embodiment, thus the similar description is omitted by allocating identical symbols respectively in the figure. In other words, the spectacles-type image display device in accordance with the present embodiment has the functions and effects owned by the spectacles-type image display device in accordance with the second embodiment.

As shown in FIG. 12, in the present embodiment, the incidence angle of the image light directs outward when seeing from the viewer side with respect to the right eye and the left eye of the viewer. That is, the viewer who wears the spectacles-type image display device in accordance with the present embodiment sees either one of images. At this time, the viewer can selectively see a necessary display by displaying images that are different between the right eye and the left eye. In other words, the information for the two images can be displayed by putting each image for the right eye and for the left eye together. Thus the present embodiment is suitable when the spectacles-type image display device according to the present invention is used as an information provision device.

What is claimed is:

1. A spectacles-type image display device, comprising:
   an image output unit that is disposed on a frame of spectacles and includes a display element for displaying an image and a projection lens for magnifying and projecting the image; and
   a reflection unit that is disposed adjacent to at least one of spectacle lenses and is configured, when a viewer wears the spectacles, to reflect image light that is output from the image output unit toward an eyeball of the viewer so that the viewer can see a virtual image of the image,
   wherein the reflection unit is a reflection member having no refractive power, and an effective luminous flux that is output from the image output unit and reaches the eyeball of the viewer is configured so that a width of the luminous flux perpendicular to an optical axis is the smallest at the reflection unit with respect to an optical axis cross-section of the image light in at least one direction.

2. The spectacles-type image display device according to claim 1, wherein the smallest width of the cress-section perpendicular to the optical axis is smaller than 4 mm, which is an average pupil diameter of human.

3. The spectacles-type image display device according to claim 1, wherein, with respect to a reflection surface of the reflection member, a width in a direction parallel to an incident surface is smaller than a width in a direction perpendicular to the incident surface.

4. The spectacles-type image display device according to claim 3, wherein the display element is in the shape of rectangular and is disposed so that the longitudinal direction of the shape of rectangular corresponds to the smallest width direction of the reflection surface of the reflection member.

5. The spectacles-type image display device according to claim 1, wherein, with respect to the effective luminous flux that is output from the image output unit and reaches the eyeball of the viewer, a pupil position in the lateral direction, which is an exit pupil position with respect to the optical axis cross-section parallel to the incident surface of the reflection member, is located near the reflection member, and a pupil position in the longitudinal direction, which is an exit pupil position with respect to the optical axis cross-section perpendicular to the incident surface of the reflection member, is located closer to a pupil of the eyeball of the viewer than the pupil position in the lateral direction.

6. The spectacles-type image display device according to claim 1, wherein the reflection member is embedded in the spectacle lens.

7. The spectacles-type image display device according to claim 1, wherein an optical axis of the projection lens passes through the reflection member, and the projection lens or the image output unit that includes the projection lens is rotatably held around the reflection unit.

8. The spectacles-type image display device according to claim 1, wherein the optical axis of the projection lens passes through the reflection member, and the reflection unit is rotatably held by an axis that lies in the reflection surface of the reflection unit and is perpendicular to an incident surface.

9. The spectacles-type image display device according to claim 1, wherein, with respect to the image output unit, a deviation prism is provided between the display element and the projection lens.

10. The spectacles-type image display device according to claim 9, wherein the display element is disposed to face forward direction of the viewer, and light ray output from the display element is incident on the deviation prism, is deviated by 50° to 70° and exits toward the reflection unit.

11. The spectacles-type image display device according to claim 9, wherein the projection lens and the deviation prism are integrally molded.

12. The spectacles-type image display device according to claim 9, wherein the projection lens and the deviation prism are held by an endpiece of the spectacles, the display element is held by a temple of the spectacles and the display element is movable and adjustable in the direction perpendicular to a display surface.

13. The spectacles-type image display device according to claim 9, wherein distance between the projection lens and the deviation prism is adjustably held.

14. The spectacles-type image display device according to claim 9, wherein the projection lens and the deviation prism are held by an endpiece of the spectacles, the display element is held by a temple of the spectacles and the display element is movable and adjustable in the direction parallel to a display surface.

15. The spectacles-type image display device according to claim 1, wherein the display element is an organic EL.

16. The spectacles-type image display device according to claim 1, wherein, for the reflection unit, a projection cross-section with respect to the front direction of the viewer is disposed on a position where the projection cross-section does not cover a pupil of the viewer.

17. A spectacles-type image display device, comprising:
an image output unit that is disposed on a frame of spectacles and includes a display element for displaying an image and a projection lens for magnifying and projecting the image; and
a reflection unit that is disposed adjacent to at least one of spectacle lenses and is configured, when a viewer wears the spectacles, to reflect image light that is output from the image output unit toward an eyeball of the viewer so that the viewer can see a virtual image of the image,
wherein the reflection unit that is a reflection member having no refractive power is a substantial aperture stop for an effective luminous flux that is output from the image output unit and reaches the eyeball of the viewer, with respect to an optical axis cross-section of the image light in at least one direction.

18. A spectacle-type image display device, comprising:
an image output unit that is disposed on a frame of spectacles and includes a display element for displaying an image and a projection lens for magnifying and projecting the image; and
a reflection unit that is disposed adjacent to at least one of spectacle lenses and is configured, when a viewer wears the spectacles, to reflect image light that is output from the image output unit toward an eyeball of the viewer so that the viewer can see a virtual image of the image,
wherein the reflection unit that is a reflection member having no refractive power is an exit pupil for an effective luminous flux that is output from the image output unit and reaches the eyeball of the viewer, with respect to an optical axis cross-section of the image light in at least one direction.

\* \* \* \* \*